US008193890B2

(12) United States Patent
Gonzalez Romero et al.

(10) Patent No.: US 8,193,890 B2
(45) Date of Patent: Jun. 5, 2012

(54) METHOD AND ARRANGEMENT FOR WINDING A WINDING WIRE ONTO A WINDING BODY AND ASSOCIATED MAGNET ASSEMBLY FOR A SOLENOID VALVE

(75) Inventors: Rafael Gonzalez Romero, Ilsfeld-Auenstein (DE); Bernd Kellner, Waltenhofen (DE)

(73) Assignee: Robert Bosch GmbH, Stuttgart (DE)

( * ) Notice: Subject to any disclaimer, the term of this patent is extended or adjusted under 35 U.S.C. 154(b) by 117 days.

(21) Appl. No.: 12/674,584

(22) PCT Filed: Jul. 7, 2008

(86) PCT No.: PCT/EP2008/058777

§ 371 (c)(1),
(2), (4) Date: Feb. 22, 2010

(87) PCT Pub. No.: WO2009/024399

PCT Pub. Date: Feb. 26, 2009

(65) Prior Publication Data

US 2011/0121216 A1 May 26, 2011

(30) Foreign Application Priority Data

Aug. 21, 2007 (DE) ......................... 10 2007 039 344

(51) Int. Cl.
*F16K 31/02* (2006.01)
*B21D 11/14* (2006.01)
*H01F 27/28* (2006.01)

(52) U.S. Cl. ..................... 336/180; 251/129.15; 72/371; 336/182

(58) Field of Classification Search .................. 336/208, 336/192, 198, 182, 180; 251/129.15; 72/371, 72/343

See application file for complete search history.

(56) References Cited

U.S. PATENT DOCUMENTS 4,347,493 A * 8/1982 Adams et al. ................. 336/192
4,585,964 A * 4/1986 Hildebrandt .................... 310/71
5,774,036 A 6/1998 Hrytzak et al.
6,369,682 B1 * 4/2002 Thompson et al. ........... 336/192

(Continued)

FOREIGN PATENT DOCUMENTS

WO 9702581 A1 1/1997

(Continued)

*Primary Examiner* — Anh Mai
(74) *Attorney, Agent, or Firm* — Ronald E. Greigg

(57) ABSTRACT

The invention relates to a method and an arrangement for winding a winding wire onto a winding body, and to an associated magnet assembly. The start of the winding wire is threaded into a first wire-receiving slot of a first electrical connection dome. By a winding operation a predefinable number of turns are then wound onto the winding body, and one end of the winding wire is threaded into a second wire-receiving slot of a second electrical connection dome and cut off. According to the invention, the start of the winding wire which has been threaded into the first wire-receiving slot is placed on a first wire support which is arranged downstream of the first wire-receiving slot. The winding wire is shaped and held before the winding operation such that the diameter of the winding wire is increased at one region positioned on the first wire support, in the direction of the width of the first wire-receiving slot, and the start of the winding wire is prevented from slipping back into the first wire-receiving slot.

20 Claims, 7 Drawing Sheets

U.S. PATENT DOCUMENTS

| | | | | |
|---|---|---|---|---|
| 7,414,502 | B2 * | 8/2008 | Tackes et al. | 335/220 |
| 7,472,883 | B2 * | 1/2009 | Murao et al. | 251/129.15 |
| 2003/0107464 | A1 * | 6/2003 | Gutierrez et al. | 336/208 |
| 2003/0151481 | A1 | 8/2003 | Kolarsky | |
| 2005/0184263 | A1 * | 8/2005 | Hiddessen et al. | 251/129.15 |

FOREIGN PATENT DOCUMENTS

| | | | |
|---|---|---|---|
| WO | 0173799 | A1 | 10/2001 |

* cited by examiner

METHOD AND ARRANGEMENT FOR WINDING A WINDING WIRE ONTO A WINDING BODY AND ASSOCIATED MAGNET ASSEMBLY FOR A SOLENOID VALVE

CROSS-REFERENCE TO RELATED APPLICATION

This application is a 35 USC 371 application of PCT/EP2008/058777 filed on Jul. 7, 2008.

BACKGROUND OF THE INVENTION

1. Field of the Invention

The invention relates to a method for winding a winding wire onto a winding body, an arrangement for winding a winding wire onto a winding body, and an associated magnet assembly for a solenoid valve.

2. Description of the Prior Art

In modern brake systems and driver assist systems, which include for example an antilock brake system (ABS), a traction control system (TCS), or an electronic stability program system (ESP system), solenoid valves are used for pressure modulation. Broken down roughly into their basic components, these solenoid valves are composed of a valve cartridge that is calk-mounted in a fluid assembly, and a magnet assembly installed as a rule in an associated control unit. The magnet assembly is activated with electrical activation signals in order to produce a corresponding magnetic field; the magnet assembly includes a wire winding that is wound onto a winding support and has a predetermined number of turns, a covering disk, and a housing casing. The covering disk here, functioning as a magnetic circuit component, is press-fitted into the housing casing in order to complete the magnetic circuit of the magnet assembly.

For the winding procedure, in which a winding wire is wound onto the winding body, a winding method is known from the prior art, which uses a so-called "wire remnant-free" winding. In this method, the winding wire is fixed in place not by means of an auxiliary pin but instead by means of an additional clamping during the changing of the winding body. In other words, a winding wire end of a preceding magnet assembly is used as the beginning of the subsequent magnet assembly. In this case, the winding wire is fixed in the winding body by means of a clamping in a wire-receiving slot of an electrical connection dome that is part of the winding body. The wire-receiving slot is embodied for connecting to the winding wire by forming a cut-and-clamped connection. Since the electrical connection dome is embodied in the form of an injection-molded plastic part, it is difficult, from an injection molding standpoint, to maintain the required tolerance for the slot width. In addition, process influences after the injection molding, such as shrinkage and water absorption are not, as a rule, taken into account in the component measurements. For this reason, the winding wire can, for example due to being pressed too weakly into the wire-receiving slot, slip back out of the wire-receiving slot during the cutting procedure on the winding machine or in subsequent assembly procedures, such as packing, transport, etc. and in the handling of the wound winding body. With too powerful a clamping, the winding wire cannot, for example, rest completely against a wire support and can separate upward from it. This can result in an incorrect positioning of the winding wire in which the contacting region toward the cutting blade is no longer present or under some circumstances, lies outside the contacting zone in the region of the cutting blade opening. In addition, a potential excessive back-slippage of the winding wire can result in a contact between the winding wire and the housing casing of the magnet assembly. Vibrations that occur with field loading can result in a shearing-through of the insulation of the winding wire and thus to a short-circuiting and therefore also a failure of the magnet assembly.

ADVANTAGES AND SUMMARY OF THE INVENTION

The method according to the invention for winding a winding wire onto a winding body has the advantage over the prior art that a winding wire beginning that is threaded into a first wire-receiving slot of a first connection dome is placed onto a first wire support that is situated after the first wire-receiving slot; before the winding procedure, the winding wire is reshaped and held in place in such a way that the diameter of the winding wire in a region resting on the first wire support is enlarged in the direction of the width of the first wire-receiving slot and the winding wire beginning is prevented from slipping back into the first wire-receiving slot. The holding and reshaping of the winding wire prevent the winding wire beginning from slipping back into the first wire-receiving slot of the first electrical connection dome during the winding procedure, the subsequent assembly procedures, and/or the handling of the wound winding body. This advantageously increases the process reliability, with the clamping dimension of the wire-receiving slot in the electrical connection dome no longer being critical to reliability.

The arrangement according to the invention for winding a winding wire onto a winding body, in which a winding wire beginning is threaded into a first wire-receiving slot of a first connection dome of the winding body, includes a holding-and-stamping die that is embodied so that—during a winding procedure by means of which a predeterminable number of winding wire turns are wound onto the winding body—it uses a holding surface to hold the winding wire beginning, which is threaded into the first wire-receiving slot, in place against a first wire support situated after the first wire-receiving slot, and reshapes the winding wire in a region resting on the first wire support in such a way that the diameter of the winding wire in this region is enlarged in the direction of the width of the first wire-receiving slot in order to prevent the winding wire beginning from slipping back into the first wire-receiving slot.

The magnet assembly according to the invention for a solenoid valve includes a winding body that has a first electrical connection dome with a first wire-receiving slot into which a winding wire beginning is threaded and a second electrical connection dome with a second wire-receiving slot into which a winding wire end is threaded. The first connection dome and the second connection dome are embodied, for example, in the form of injection-molded plastic parts and each have a respective wire support, which are situated after the first wire-receiving slot and after the second wire-receiving slot, respectively. In a region resting on the first wire support and in a region resting on the second wire support, the winding wire is reshaped in such a way that the diameter of the winding wire in these regions is enlarged in the direction of the width of the wire-receiving slot in order to prevent the winding wire beginning from slipping back into the first wire-receiving slot and to prevent the winding wire end from slipping back into the second wire-receiving slot. The plastic reshaping of the winding wire advantageously prevents the winding wire beginning and winding wire end from slipping back into the corresponding wire-receiving slot so that during the handling of the wound winding body and proper use of the magnet assembly, the winding wire beginning and winding wire end are held in place in the corresponding wire-receiving slots of the electrical connection domes and an optimal electrical connection to a corresponding control unit can be manufactured in order to produce a desired magnetic field by means of the magnet assembly.

It is particularly advantageous that the winding wire end threaded into the second wire-receiving slot is placed onto a second wire support situated after the second wire-receiving slot; after the winding procedure, the winding wire is reshaped and cut off in such a way that the diameter of the winding wire in a region resting on the second wire support is enlarged in the direction of the width of the second wire-receiving slot, thus preventing the winding wire end from slipping back into the second wire-receiving slot. The reshaping of the winding wire prevents the winding wire end from slipping back into the second wire-receiving slot of the second electrical connection dome after the cutting procedure, in subsequent assembly procedures, and/or in the handling of the wound winding body. This advantageously increases process reliability, with the clamping dimension of the wire-receiving slot in the electrical connection dome no longer being critical to reliability.

In an embodiment of the arrangement according to the invention, a cutting-and-stamping die is provided, which is embodied so as to cut off a winding wire end, which after the winding procedure, has been threaded into a second wire-receiving slot and rests against a second wire support situated after the second wire-receiving slot, and so as to reshape the winding wire in a region resting on the second wire support in such a way that the diameter of the winding wire in this region is enlarged in the direction of the width of the second wire-receiving slot in order to prevent the winding wire end from slipping back into the second wire-receiving slot. For the reshaping of the region of the threaded winding wire resting on the first wire support, the holding-and-stamping die has, for example, a first stamping protrusion that presses the winding wire into a first recess in the first wire support. The cutting-and-stamping die additionally has a second stamping protrusion that presses against the region of the threaded winding wire, which is resting on the second wire support, into a second recess in the second wire support in order to execute the reshaping. The recesses in the wire supports are embodied, for example, in the form of notches that each have a stamping edge that is situated directly behind the respective wire-receiving slot and bends the winding wire. The recesses embodied in the fond of notches, the holding-and-stamping die, the cutting-and-stamping die, and the stamping edges are embodied so that the shapes of the winding wire beginning and the winding wire end remain essentially unchanged. This advantageously assures a wire remnant-free winding, i.e. the winding wire end remaining in the wire guide of the winding machine is not bent and can thus be used as the winding wire beginning of the next winding support in the next winding process. The plastic reshaping of the winding wire in the region of the recesses and the bending of the winding wire by means of the stamping edges on the one hand prevents the back-slippage into the corresponding wire-receiving slot and on the other hand, the winding wire is deformed less in cross section, thus making it possible to facilitate the testing for the presence and spacing of the winding wire in a testing window of a subsequent camera testing and to prevent the occurrence of pseudo-errors in camera testing caused by reduced winding wire cross sections. In addition, the invention also makes it possible to reduce the volume of rejects in the manufacture of magnet assemblies.

BRIEF DESCRIPTION OF THE DRAWINGS

The invention is described in further detail below in conjunction with the drawings, in which.

DESCRIPTION OF THE PREFERRED EMBODIMENTS

Figure 1:
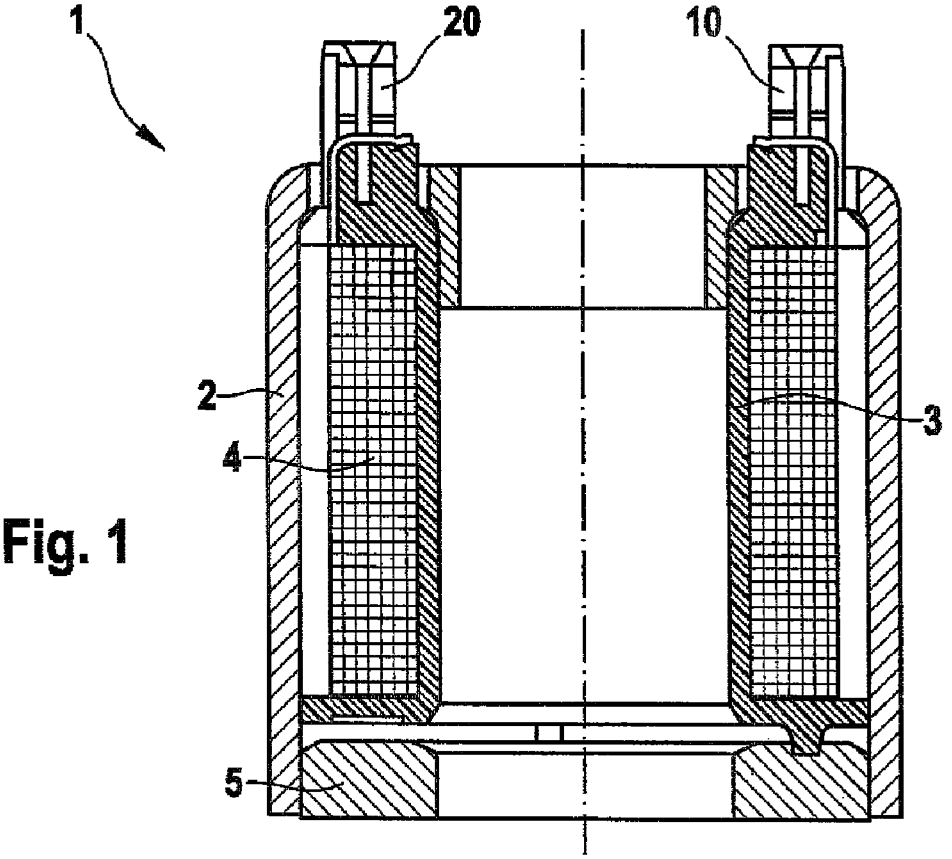
FIG. 1 is a schematic sectional depiction of a magnet assembly for a solenoid valve.
Figure 2A:
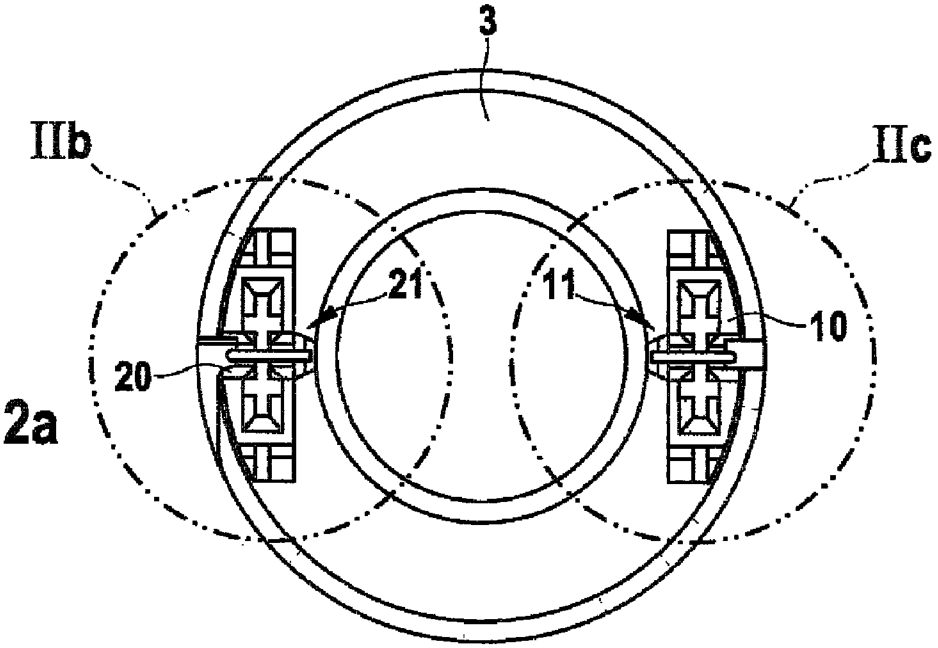
FIG. 2*a* is a top view of a winding body for the magnet assembly according to FIG. 1.
Figure 2B:
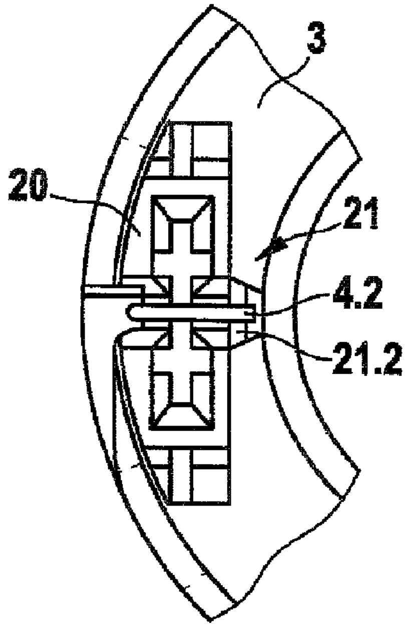
FIGS. 2*b* and 2*c* each show a detail from FIG. 2*a*.
Figure 2C:
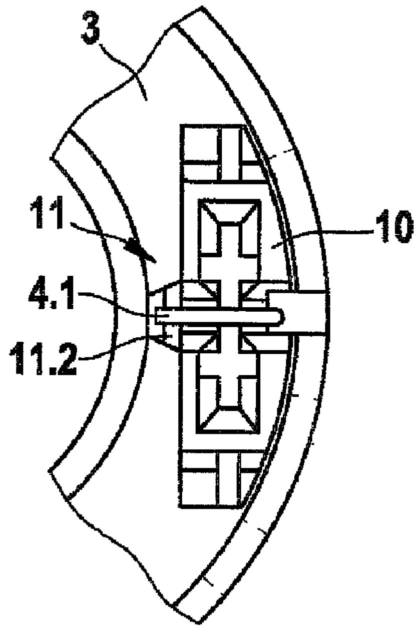

As shown in FIGS. 1 through 3*b*, a magnet assembly 1 for a solenoid valve includes a winding body 3 that has a first electrical connection dome 10, which is equipped with a first wire-receiving slot 12 embodied in the form of a cutting-and-clamping connection 13 into which slot a winding wire beginning 4.1 is threaded, and a second electrical connection dome 20, which is equipped with a second wire-receiving slot 22 embodied in the form of a cutting-and-clamping connection 23 into which slot a winding wire end 4.2 is threaded. A magnetic circuit of the magnet assembly 1 is formed by a housing casing 2 and a covering disk 5 that is press-fitted into the housing casing 2. The electrical connection domes 10, 20 are embodied, for example, in the form of injection-molded plastic parts. As is also shown in FIGS. 2*a* through 2*c*, the first electrical connection dome 10 and the second electrical connection dome 20 each have a respective wire support 11, 21 equipped with a respective first and second recess 11.2, 21.2.

Figure 3A:
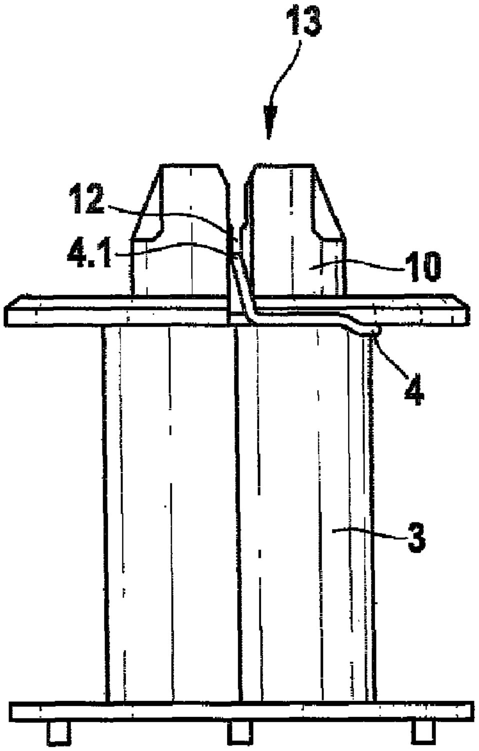
FIG. 3*a* is a schematic side view of an unwound winding body for the magnet assembly according to FIG. 1.
Figure 3B:
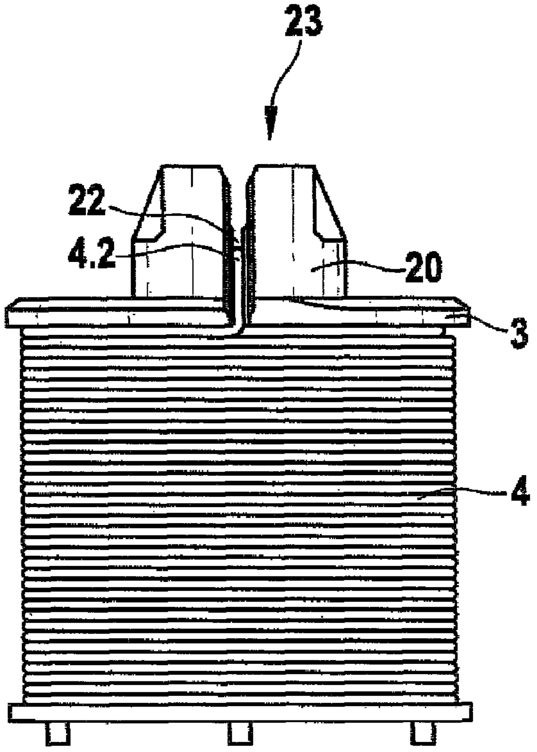
FIG. 3*b* is a schematic side view of a wound winding body for the magnet assembly according to FIG. 1.

As is shown in FIG. 3*a*, before a winding procedure by means of which a predeterminable number of winding wire turns are wound onto the winding body 3, the winding wire beginning 4.1 is threaded into the first wire-receiving slot 12 of the first connection dome 10. As shown in FIG. 3, after the winding procedure, the winding wire end 4.2 is threaded into the second wire-receiving slot 22 of the second connection dome 20 and cut off.

Figure 4:
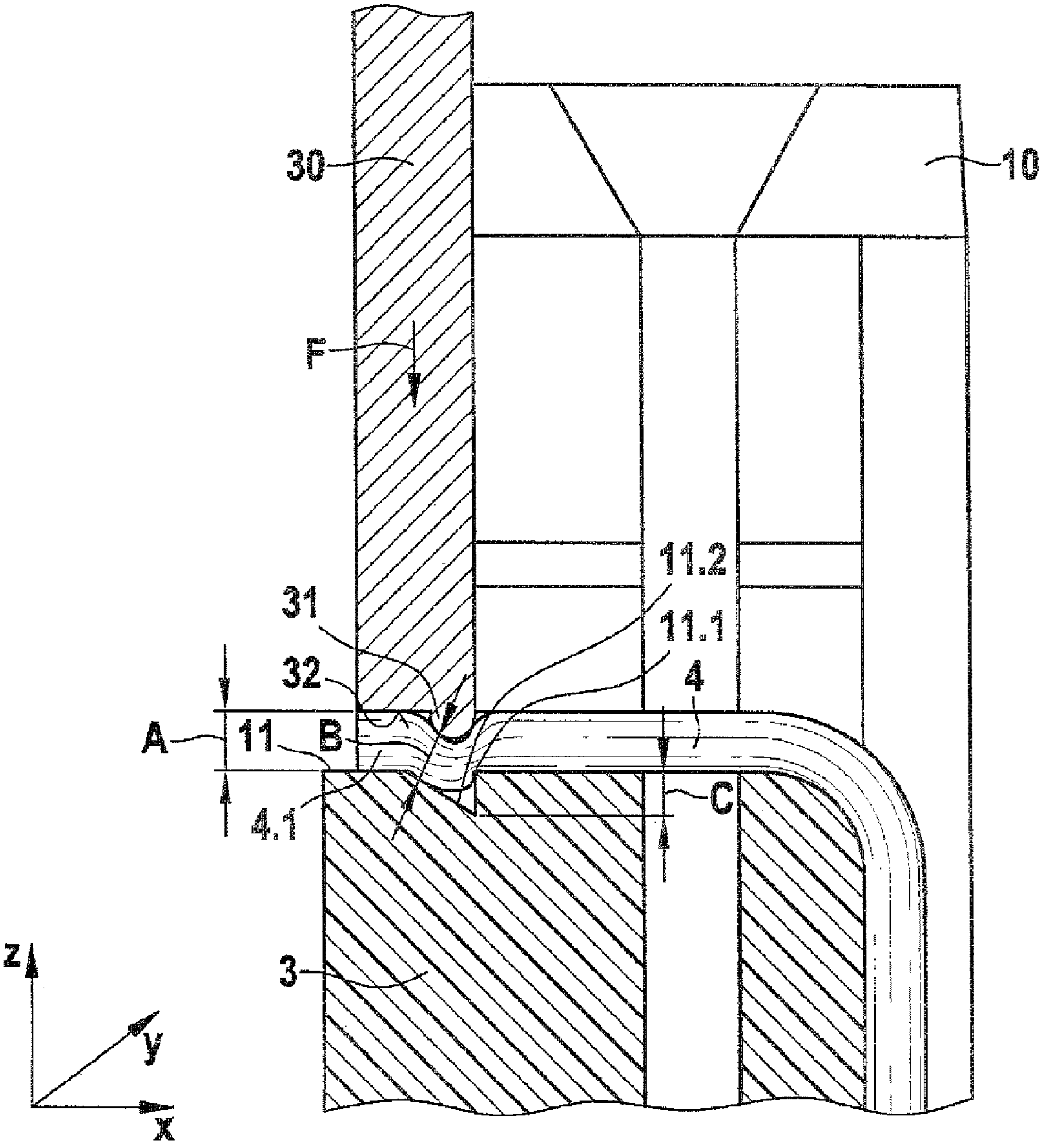
FIG. 4 is a schematic sectional depiction of a first connection dome for the magnet assembly according to FIG. 1, before a winding procedure.
Figure 5A:
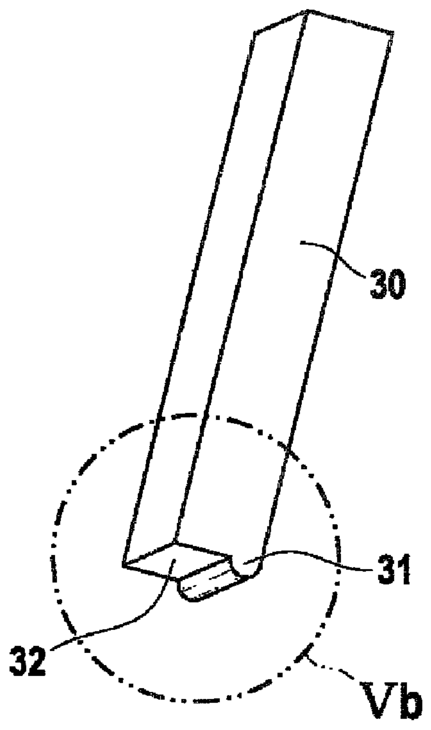
FIG. 5*a* is a perspective depiction of a holding-and-stamping die for the winding of a winding body of the magnet assembly according to FIG. 1.
Figure 5B:
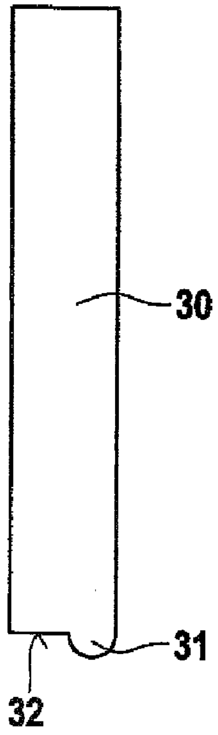
FIG. 5*b* is a schematic side view of the holding-and-stamping die according to FIG. 5*a*.

As is shown in FIG. 4, before the winding procedure and during the winding procedure, the winding wire beginning 4.1 that is threaded into the first wire-receiving slot 12 (FIG. 3*a*) rests against a first wire support 11 situated after the first wire-receiving slot 12 and is held in place by a holding surface 32 of a holding-and-stamping die 30. As is shown in FIGS. 5*a* and 5*b*, the holding-and-stamping die 30 includes the holding surface 32 and the stamping protrusion 31. The stamping protrusion 31 of the holding-and-stamping die 30 presses the winding wire 4 over a stamping edge 11.1 into the recess 11.2 in such a way that the winding wire 4 has a downward bend in the region of the stamping edge 11.1 and is reshaped in such a way that the diameter of the winding wire 4 in the region of the first recess 11.2 is enlarged in the direction of the width of the first wire-receiving slot 12, thus preventing the winding wire beginning 4.1 from slipping back into the first wire-receiving slot 12. In addition to absorbing and withstanding the clamping forces of the winding wire 4, the clamping of the winding wire 4 in the first electrical connection dome 10 must also absorb and withstand the tensile forces during the winding procedure. This is facilitated by the reshaping of the winding wire 4 according to the invention. In addition, by contrast with the conventional winding procedure, the winding wire beginning 4.1 is deformed less in its cross section since the hold-down force of the holding surface 32 in the region of the winding wire beginning 4.1 can be reduced by the reshaping procedure of the winding wire 4 in the region of the recess 11.2 and the winding wire 4 can nevertheless be prevented from slipping back into the wire-receiving slot 12. The holding-and-stamping die 30 thus performs a holding function, a plastic reshaping function, and a bending function on the winding wire 4. As is also shown in FIG. 4, the diameter A of the winding wire in the region of the winding wire beginning 4.1 remains unchanged and, in the region of the recess 11.2, is reduced by means of the bending and reshaping procedure to a remaining diameter B, which corresponds, for example, to ⅔ the original diameter A. The depth C of the recess 11.2 embodied in the form of a notch corresponds to approximately half the original diameter A of the winding wire 4.

Figure 6:
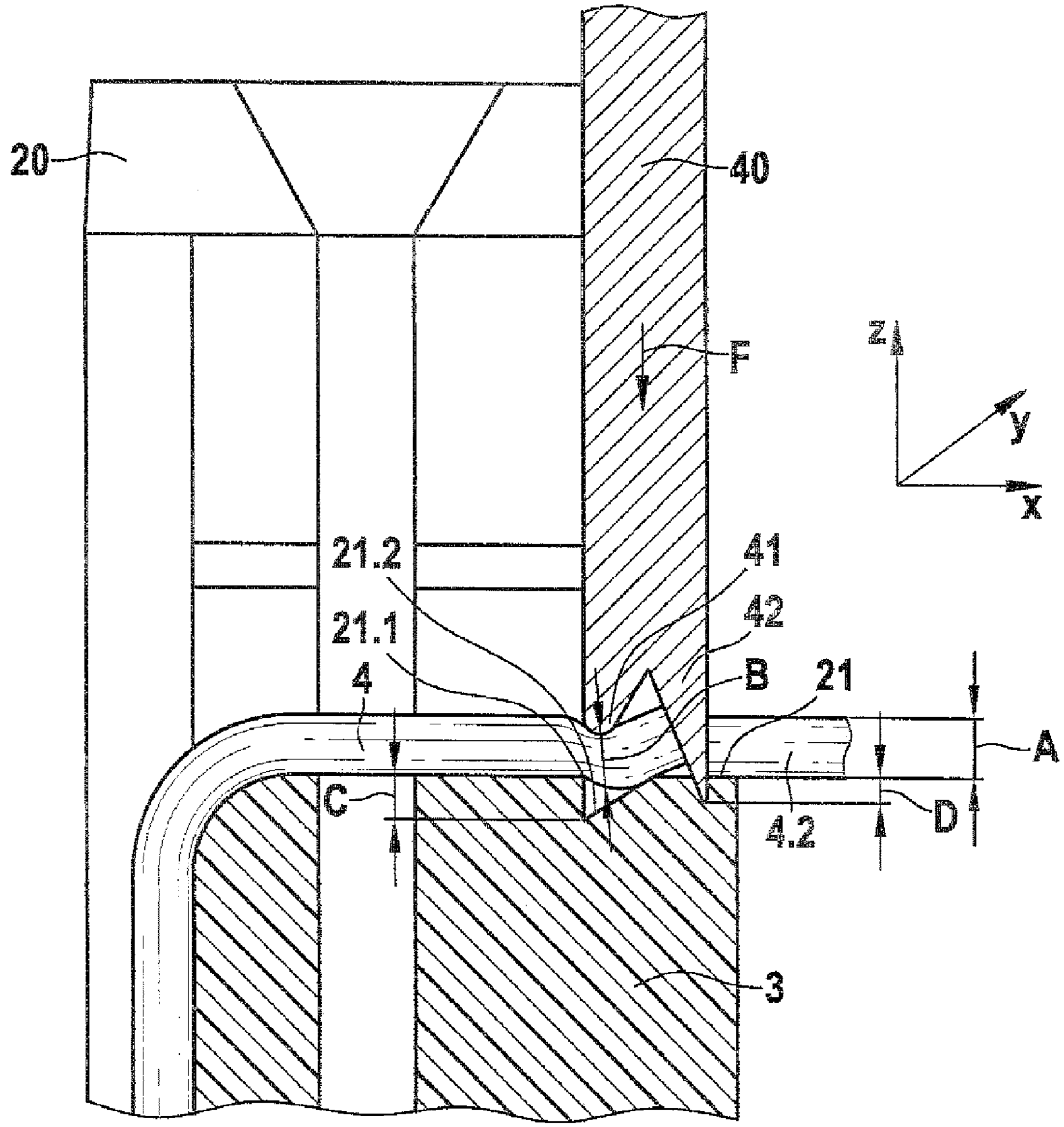
FIG. 6 is a schematic sectional depiction of a second connection dome for the magnet assembly according to FIG. 1, after a winding procedure.
Figure 7A:
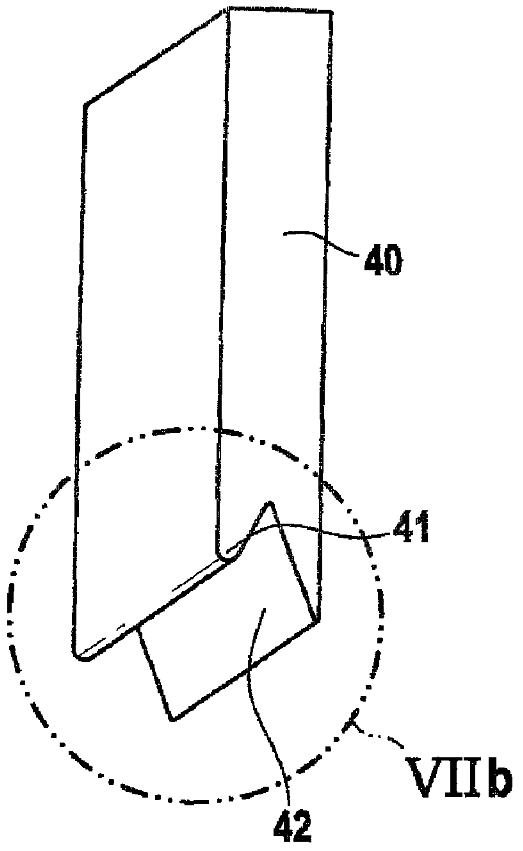
FIG. 7*a* is a perspective depiction of a cutting-and-stamping die for the winding of a winding body of the magnet assembly according to FIG. 1.
Figure 7B:
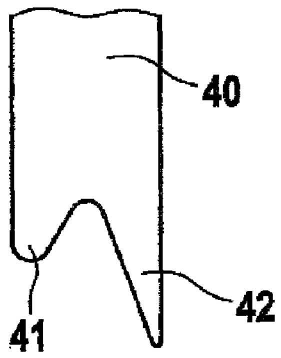
FIG. 7*b* is a schematic side view of the cutting-and-stamping die according to FIG. 7*a*.

As is shown in FIG. 6, after the winding procedure, the winding wire end 4.2 threaded into the second wire-receiving slot 22 (FIG. 3*b*) rests against a second wire support 21 situated after the second wire-receiving slot 22 and is cut off by a cutting blade 42 of a cutting-and-stamping die 40. As is shown in FIGS. 7*a* and 7*b*, the cutting-and-stamping die 40 includes the cutting blade 42 and a stamping protrusion 41. The stamping protrusion 41 of the cutting-and-stamping die 40 presses the winding wire 4 over a stamping edge 21.1 into the recess 21.2 so that the winding wire 4 has a downward bend in the region of the stamping edge 21.1 and is reshaped in such a way that the diameter of the winding wire 4 in the region of the second recess 21.2 is enlarged in the direction of the width of the second wire-receiving slot 22, thus preventing the winding wire end 4.2 from slipping back into the second wire-receiving slot 22. By means of the reshaping of the winding wire 4 according to the invention, the winding wire 4 is held in place during the cutting procedure; during the cutting procedure, the cutting-and-stamping die 40 simultaneously performs a cutting function, a plastic reshaping function, and a bending function. During the cutting, the cutting blade 42 of the cutting-and-stamping die 40 does not damage or deform the winding wire end remaining in the winding machine. This assures a wire remnant-free winding, which means that the wire end remaining in the wire guide of the winding machine is not bent and can therefore be used as the winding wire beginning 4.1 of the next winding support 3 in the next winding procedure. As is also shown in FIG. 6, the diameter A of the winding wire in the region of the winding wire end 4.2 remains unchanged and, in the region of the recess 21.2, is reduced by means of the bending and reshaping procedure to a remaining diameter B, which corresponds, for example, to ⅔ the original diameter A of the winding wire 4. The depth C of the second recess 21.2 embodied in the form of a notch corresponds to approximately half the original diameter A of the winding wire 4. During the cutting procedure, the cutting blade 42 penetrates into the second wire support 21 to the depth D.

The arrangement according to the invention for winding the winding wire 4 onto the winding body 3 and the associated magnet assembly 1 can be embodied so that winding wires 4 of different diameters can be wound onto the winding body 3 using the method according to the invention. Magnet assemblies that produce different magnetic forces can thus be manufactured using the same arrangement and the same winding body. The holding-and-stamping die 30, the cutting-and-stamping die 40, and the wire-receiving slots 12, 22 of the electrical connection domes 10, 20 can, for example, be embodied so that it is possible to work with a plurality of different wire diameters, including insulating varnish.

The reshaping of the winding wire according to the invention advantageously prevents the winding wire from slipping back into the corresponding wire-receiving slots of the electrical connection domes during the winding procedure, the cutting procedure, subsequent assembly procedures, and/or the handling of the wound winding body. This advantageously increases the process reliability, with the clamping dimension of the wire-receiving slot in the electrical connection dome no longer being critical to reliability.

The foregoing relates to the preferred exemplary embodiments of the invention, it being understood that other variants and embodiments thereof are possible within the spirit and scope of the invention, the latter being defined by the appended claims.

The invention claimed is:

1. A method for winding a winding wire onto a winding body, comprising the steps of:

threading a winding wire beginning into a first wire-receiving slot of a first electrical connection dome; then winding a predeterminable number of turns onto the winding body by a winding procedure; and, after the winding procedure, threading a winding wire end into a second wire-receiving slot of a second electrical connection dome and cutting the winding wire end off, wherein the winding wire beginning threaded into the first wire-receiving slot is placed onto a first wire support situated after the first wire-receiving slot and, before the winding procedure, the winding wire is reshaped and held in place in such a way that a diameter of the winding wire in a region resting on the first wire support is enlarged in a direction of a width of the first wire-receiving slot and the winding wire beginning is prevented from slipping back into the first wire-receiving slot.

2. The method as recited in claim 1, wherein the winding wire end threaded into the second wire-receiving slot is placed onto a second wire support situated after the second wire-receiving slot and, after the winding procedure, the winding wire is reshaped and cut off in such a way that a diameter of the winding wire in a region resting on the second wire support is enlarged in a direction of a width of the second wire-receiving slot and the winding wire end is prevented from slipping back into the second wire-receiving slot.

3. The method as recited in claim 2, wherein the reshaping of the winding wire before the winding procedure is carried out by means of a first recess situated in the first wire support and the reshaping of the winding wire after the winding procedure is carried out by means of a second recess situated in the second wire support.

4. The method as recited in claim 1, wherein the reshaping of the winding wire before the winding procedure is carried out by means of a first recess situated in the first wire support and, wherein the winding wire is reshaped after the winding procedure, and the reshaping of the winding wire after the winding procedure is carried out by means of a second recess situated in the second wire support.

5. The method as recited in claim 4, wherein the first recess and the second recess are each embodied as a notch, which is equipped with a stamping edge, into which the winding wire is pressed, each stamping edge being situated directly after a respective wire-receiving slot and the winding wire being bent and/or crimped by means of the stamping edges.

6. The method as recited in claim 5, wherein the stamping edges are embodied so that a shape of the winding wire beginning and of the winding wire end remain essentially unchanged.

7. An arrangement for winding a winding wire onto a winding body, in which a winding wire beginning is threaded into a first wire-receiving slot of a first electrical connection dome of the winding body, and a holding-and-stamping die is embodied so that during a winding procedure by means of which a predeterminable number of turns are wound onto the winding body, the holding-and-stamping die uses a holding surface to hold the winding wire beginning, which is threaded into the first wire-receiving slot, in place against a first wire support situated after the first wire-receiving slot, and reshapes the winding wire, in a region resting on the first wire support, in such a way that a diameter of the winding wire in this region is enlarged in a direction of a width of the first wire-receiving slot in order to prevent the winding wire beginning from slipping back into the first wire-receiving slot.

8. The arrangement as recited in claim 7, wherein of a cutting-and-stamping die that is embodied so as to cut off a winding wire end, which after the winding procedure, has been threaded into a second wire-receiving slot and rests against a second wire support situated after the second wire-receiving slot, and so as to reshape the winding wire, in a region resting on the second wire support, in such a way that a diameter of the winding wire in this region is enlarged in a direction of a width of the second wire-receiving slot in order to prevent the winding wire end from slipping back into the second wire-receiving slot.

9. The arrangement as recited in claim 8, wherein the holding-and-stamping die has a first stamping protrusion that presses the region of the threaded winding wire resting on the first wire support into a first recess in the first wire support in order to reshape the winding wire.

10. The arrangement as recited in claim 9, wherein the cutting-and-stamping die has a second stamping protrusion that presses the region of the threaded winding wire resting on the second wire support into a second recess in the second wire support in order to reshape the winding wire.

11. The arrangement as recited in claim 8, wherein the cutting-and-stamping die has a second stamping protrusion that presses the region of the threaded winding wire resting on the second wire support into a second recess in the second wire support in order to reshape the winding wire.

12. The arrangement as recited in claim 7, wherein the holding-and-stamping die has a first stamping protrusion that presses the region of the threaded winding wire resting on the first wire support into a first recess in the first wire support in order to reshape the winding wire.

13. The arrangement as recited in claim 12, wherein the recesses are each embodied as a notch, which is equipped with a stamping edge, into which the winding wire regions are pressed; the stamping edges are situated directly behind a respective wire-receiving slot and bend the winding wire.

14. The arrangement as recited in claim 13, wherein the recesses embodied as notches, the holding-and-stamping die, the cutting-and-stamping die, and the stamping edges are embodied so that the shapes of the winding wire beginning and the winding wire end remain essentially unchanged.

15. A magnet assembly for a solenoid valve having a winding body that has a first electrical connection dome with a first wire-receiving slot into which a winding wire beginning is threaded and a second electrical connection dome with a second wire-receiving slot into which a winding wire end is threaded, wherein in a region situated after the first wire-receiving slot and resting on a first wire support and in a region situated after the second wire-receiving slot and resting on a second wire support, the winding wire is reshaped in such a way that a diameter of the winding wire in these regions is enlarged in a direction of a width of the wire-receiving slot in order to prevent the winding wire beginning from slipping back into the first wire-receiving slot and to prevent the winding wire end from slipping back into the second wire-receiving slot.

16. The magnet assembly as recited in claim 15, wherein the first wire support has a first recess with a stamping edge let into it, into which recess a region of the winding wire resting on the first wire support is pressed in order to execute reshaping of the winding wire and, in a region of the stamping edge of the first recess, the winding wire has a bend and/or a crimp.

17. The magnet assembly as recited in claim 15, wherein the second wire support has a second recess with a stamping edge let into it, into which recess the region of the winding wire resting on the second wire support is pressed in order to execute reshaping of the winding wire and, in a region of the stamping edge of the second recess, the winding wire has a bend and/or a crimp.

18. The magnet assembly as recited in claim 16, wherein the second wire support has a second recess with a stamping edge let into it, into which recess the region of the winding wire resting on the second wire support is pressed in order to execute reshaping of the winding wire and, in a region of the stamping edge of the second recess, the winding wire has a bend and/or a crimp.

19. The magnet assembly as recited in claim 16, wherein the stamping edge of the first recess and of the second recess are situated directly after a respective wire-receiving slot.

20. The magnet assembly as recited in claim 17, wherein the stamping edge of the first recess and of the second recess are situated directly after a respective wire-receiving slot.

* * * * *